United States Patent
Sheth et al.

(10) Patent No.: US 9,445,259 B2
(45) Date of Patent: Sep. 13, 2016

(54) SERVICE PROVIDER CERTIFIED DEVICE POLICY MANAGEMENT

(71) Applicant: ALCATEL LUCENT CANADA, INC., Ottawa (CA)

(72) Inventors: Tiru K. Sheth, Ottawa (CA); Ramaswamy Subramanian, Ottawa (CA)

(73) Assignee: Alcatel Lucent, Boulogne-Billancourt (FR)

(*) Notice: Subject to any disclaimer, the term of this patent is extended or adjusted under 35 U.S.C. 154(b) by 162 days.

(21) Appl. No.: 14/034,924

(22) Filed: Sep. 24, 2013

(65) Prior Publication Data

US 2015/0085756 A1    Mar. 26, 2015

(51) Int. Cl.
*H04W 4/00* (2009.01)
*H04W 8/20* (2009.01)
*H04W 8/22* (2009.01)
*H04W 48/02* (2009.01)
*H04W 48/14* (2009.01)

(52) U.S. Cl.
CPC ............ *H04W 8/205* (2013.01); *H04W 8/22* (2013.01); *H04W 48/02* (2013.01); *H04W 48/14* (2013.01)

(58) Field of Classification Search
CPC ....... H04W 8/18; H04W 8/20; H04W 8/205; H04W 8/22; H04W 8/24
See application file for complete search history.

(56) References Cited

U.S. PATENT DOCUMENTS

| | | | | |
|---|---|---|---|---|
| 8,903,737 | B2 * | 12/2014 | Cameron | G06Q 20/04 705/26.1 |
| 8,966,034 | B1 * | 2/2015 | Paczkowski | H04W 8/18 455/435.2 |
| 2004/0082346 | A1 * | 4/2004 | Skytt et al. | 455/456.3 |
| 2005/0189914 | A1 * | 9/2005 | Esses | 320/116 |
| 2008/0119174 | A1 * | 5/2008 | Farkas et al. | 455/414.1 |
| 2008/0267153 | A1 * | 10/2008 | Mukherjee et al. | 370/338 |
| 2011/0116382 | A1 * | 5/2011 | McCann et al. | 370/241 |
| 2013/0258865 | A1 * | 10/2013 | Kovvali | H04W 24/10 370/241 |

* cited by examiner

Primary Examiner — Kan Yuen
(74) Attorney, Agent, or Firm — Kramer & Amado, P.C.

(57) ABSTRACT

Various exemplary embodiments relate to a method performed by a policy server. The method includes: receiving a request for service, the request including an identification of user equipment; determining a user equipment type (TAC); evaluating a policy rule based on the user equipment type, the policy rule including a condition referencing at least one user equipment type; and responding to the request for service based on evaluation of the policy rule.

18 Claims, 5 Drawing Sheets

SERVICE PROVIDER CERTIFIED DEVICE POLICY MANAGEMENT

CROSS-REFERENCE TO RELATED APPLICATIONS

This application is related to the following co-pending application, which is hereby incorporated by reference for all purposes as if fully set forth herein: application Ser. No. 14/034,878, filed on Sep. 24, 2013, "RESIDENTIAL GATEWAY BASED POLICY."

TECHNICAL FIELD

Various exemplary embodiments disclosed herein relate generally to communications networks.

BACKGROUND

Communications networks, in particular, mobile networks allow various devices to connect to the network in order to obtain communications services. A subscriber identity module (SIM) card may be inserted into various devices in order to select the mobile network or move an existing subscriber to a new device. Use of a SIM card allows users to switch mobile networks. For example, users may switch a device sold by one network provider to the mobile network of another provider. Users may also attempt to connect imported devices to the mobile network. The flexibility of SIM cards increases the number of devices that may be connected to a mobile network.

SUMMARY

A brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a policy server. The method includes: receiving a request for service, the request including an identification of user equipment; determining a user equipment type; evaluating a policy rule based on the user equipment type, the policy rule including a condition referencing at least one user equipment type; and responding to the request for service based on evaluation of the policy rule.

In various embodiments, the method further includes determining a marketing name for the user equipment, wherein the condition references the at least one user equipment type according to the marketing name. The marketing name may correspond to a plurality of user equipment types.

In various embodiments, the user equipment type is a type allocation code (TAC) extracted from a user-equipment-info attribute value pair (AVP) received in the request for service.

In various embodiments, the condition references a plurality of user equipment types In various embodiments, the method further includes determining that the request for service is not related to a known subscriber; and authorizing default services based on the user equipment type. The default services may include a limit on at least one of an available time period and a data volume.

In various embodiments, the method further includes: authorizing a default session configured to provide access to a service portal; storing the identification of user equipment in association with the default session; receiving, from the portal, a request for identification of user equipment associated with the session; sending the stored identification of user equipment to the portal; receiving new subscriber information including the identification of user equipment; and updating the session based on the new subscriber information. The method may further include determining that the request for service is not related to a known subscriber, wherein the default session is based on an unknown subscriber identifier and certified user equipment type. The method may further include storing an IP address for the default session, wherein the request for identification of user equipment associated with the session includes the IP address.

Various exemplary embodiments relate to a non-transitory machine-readable storage medium encoded with instructions executable by the processor of a policy server for performing the above describe method.

Various exemplary embodiments relate to a policy server including: an interface configured to receive a service request initiated by a user equipment attaching to a mobile network, the service request including a user equipment identification; a device mapper configured to determine a marketing name of the device based on the user equipment identification; and a rules engine processor configured to evaluate conditions of policy rules and execute actions corresponding to true conditions, at least one policy rule including a condition based on the marketing name of the device.

In various embodiments, the device mapper includes a non-transitory machine-readable storage medium storing a plurality of type allocation codes, each type allocation code mapped to a marketing name.

In various embodiments, the condition of the at least one rule includes a certified device marketing name and the action of the at least one rule instructs the rules engine to allow a session providing service to the user equipment. The policy server may further include a session information storage configured to store information regarding the session including the marketing name of the user equipment; and an application programming interface configured to provide an external service portal access to the session information and configured to receive subscriber information from the service portal.

Various exemplary embodiments relate to a method performed by a policy server. The method includes: receiving a request for service, the request including an identification of user equipment; authorizing a default session configured to provide access to a service portal; storing the identification of user equipment in association with the default session; receiving, from the portal, a request for identification of user equipment associated with the session; sending the stored identification of user equipment to the portal; receiving new subscriber information including the identification of user equipment; and updating the session based on the new subscriber information.

Various exemplary embodiments relate to a method performed by a service portal. The method includes: receiving a request for new subscriber registration from a user equipment; determining an IP address of the user equipment; requesting, from a policy server, a user equipment type; determining a set of compatible subscriptions based on the user equipment type; receiving a selection of a compatible subscription from the user equipment; and sending new subscription information based on the selected compatible subscription to the policy server.

It should be apparent that, in this manner, various exemplary embodiments enable policy decisions based on user equipment device. In particular, by analyzing the TAC, a policy server may determine the marketing name of a device and provide policy according to the model of the device.

BRIEF DESCRIPTION OF THE DRAWINGS

In order to better understand various exemplary embodiments, reference is made to the accompanying drawings, wherein.

DETAILED DESCRIPTION

Figure 1:
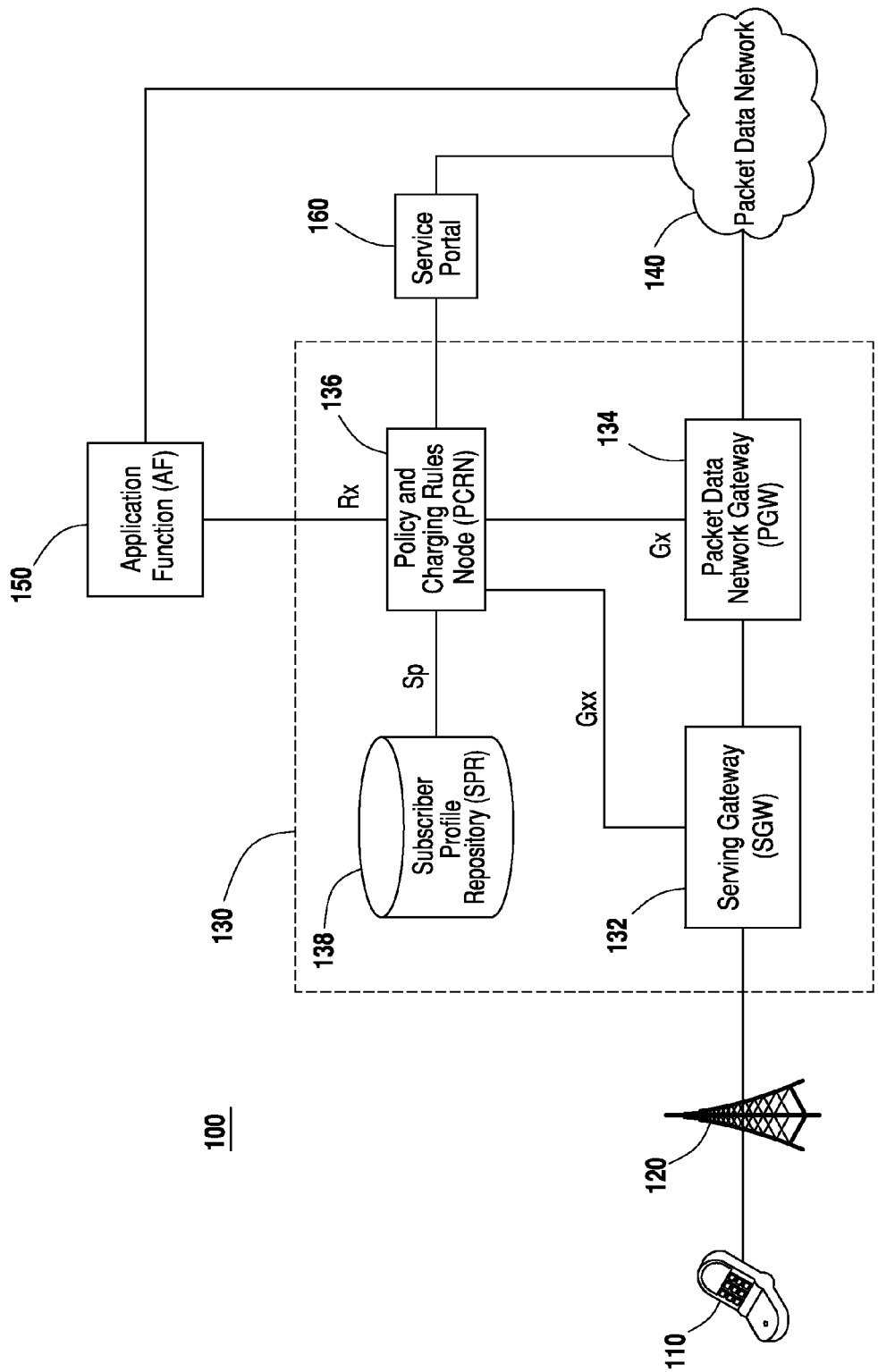
FIG. 1 illustrates an exemplary subscriber network for providing various data services.

As the number of available devices grows, mobile networks may suffer from compatibility issues. For example, users may install a SIM card into device that is not compatible with the network. An incompatible device may cause problems for the mobile network, such as, for example sending repeated requests that consume network resources.

Identifying a model of a network device connecting to a mobile network may allow a network policy server, such as a policy and charging rules node (PCRN), to make policy decisions based on the type of network device. For example, a policy server may limit network access to certified devices that are known to be compatible with the mobile network. A policy server may also provide certified devices with default services regardless of the subscriber. In various embodiments, a policy server may facilitate subscriber selection of customized service plans based on the type of mobile device.

Referring now to the drawings, in which like numerals refer to like components or steps, there are disclosed broad aspects of various exemplary embodiments.

FIG. 1 illustrates an exemplary subscriber network 100 for providing various data services. Exemplary subscriber network 100 may be a telecommunications network or other network for providing access to various services. Exemplary subscriber network 100 may include user equipment 110, base station 120, evolved packet core (EPC) 130, packet data network 140, application function (AF) 150, and service portal 160.

User equipment 110 may be a device that communicates with packet data network 140 for providing the end-user with a data service. Such data service may include, for example, voice communication, text messaging, multimedia streaming, and Internet access. More specifically, in various exemplary embodiments, user equipment 110 is a personal or laptop computer, wireless email device, cell phone, tablet, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by 3GPP standards. Thus, base station 120 may be a device that communicates with user equipment 110 via a first medium, such as radio waves, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with EPC 130. In such embodiments, base station 120 may not be present.

Evolved packet core (EPC) 130 may be a device or network of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to various 3GPP standards. Accordingly, EPC 130 may include a serving gateway (SGW) 132, a packet data network gateway (PGW) 134, a policy and charging rules node (PCRN) 136, and a subscription profile repository (SPR) 138.

Serving gateway (SGW) 132 may be a device that provides gateway access to the EPC 130. SGW 132 may be the first device within the EPC 130 that receives packets sent by user equipment 110. SGW 132 may forward such packets toward PGW 134. SGW 132 may perform a number of functions such as, for example, managing mobility of user equipment 110 between multiple base stations (not shown) and enforcing particular quality of service (QoS) characteristics for each flow being served. In various implementations, such as those implementing the Proxy Mobile IP standard, SGW 132 may include a Bearer Binding and Event Reporting Function (BBERF). In various exemplary embodiments, EPC 130 may include multiple SGWs (not shown) and each SGW may communicate with multiple base stations (not shown).

Packet data network gateway (PGW) 134 may be a device that provides gateway access to packet data network 140. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Therefore, PGW 134 may be a policy and charging enforcement node (PCEN). PGW 134 may include a number of additional features such as, for example, packet filtering, deep packet inspection, and subscriber charging support. PGW 134 may also be responsible for requesting resource allocation for unknown application services.

Policy and charging rules node (PCRN) 136 may be a device or group of devices that receives requests for application services, generates PCC rules, and provides PCC rules to the PGW 134 and/or other PCENs (not shown). PCRN 136 may be in communication with AF 150 via an Rx interface. As described in further detail below with respect to AF 150, PCRN 136 may receive an application request in the form of an Authentication and Authorization Request (AAR) from AF 150. Upon receipt of AAR (not shown), PCRN 136 may generate at least one new PCC rule for fulfilling the application request.

PCRN 136 may also be in communication with SGW 132 and PGW 134 via a Gxx and a Gx interface, respectively. PCRN 136 may receive an application request in the form of a credit control request (CCR) (not shown) from SGW 132 or PGW 134. As with AAR, upon receipt of a CCR, PCRN may generate at least one new PCC rule for fulfilling the application request. In various embodiments, AAR and the CCR may represent two independent application requests to be processed separately, while in other embodiments, AAR and the CCR may carry information regarding a single application request and PCRN 136 may create at least one PCC rule based on the combination of AAR and the CCR. In various embodiments, PCRN 136 may be capable of handling both single-message and paired-message application requests.

Upon creating a new PCC rule or upon request by the PGW 134, PCRN 136 may provide a PCC rule to PGW 134 via the Gx interface. In various embodiments, such as those implementing the PMIP standard for example, PCRN 136 may also generate QoS rules. Upon creating a new QoS rule or upon request by the SGW 132, PCRN 136 may provide a QoS rule to SGW 132 via the Gxx interface.

The PCRN 136 may also communicate with service portal 160 via an application programming interface (API) which will be described in further detail below.

Subscription profile repository (SPR) 138 may be a device that stores information related to subscribers to the subscriber network 100. Thus, SPR 138 may include a machine-readable storage medium such as read-only memory (ROM), random-access memory (RAM), magnetic disk storage media, optical storage media, flash-memory devices, and/or similar storage media. SPR 138 may be a component of PCRN 136 or may constitute an independent node within EPC 130. Data stored by SPR 138 may include an identifier of each subscriber and indications of subscription information for each subscriber such as bandwidth limits, charging parameters, and subscriber priority.

Packet data network 140 may be any network for providing data communications between user equipment 110 and other devices connected to packet data network 140, such as AF 150. Packet data network 140 may further provide, for example, phone and/or Internet service to various user devices in communication with packet data network 140.

Application function (AF) 150 may be a device that provides a known application service to user equipment 110. Thus, AF 150 may be a server or other device that provides, for example, a video streaming or voice communication service to user equipment 110. AF 150 may further be in communication with the PCRN 136 of the EPC 130 via an Rx interface. When AF 150 is to begin providing known application service to user equipment 110, AF 150 may generate an application request message, such as an authentication and authorization request (AAR) according to the Diameter protocol, to notify the PCRN 136 that resources should be allocated for the application service. This application request message may include information such as an identification of the subscriber using the application service, an IP address of the subscriber, an APN for an associated IP-CAN session, and/or an identification of the particular service data flows that must be established in order to provide the requested service. AF 150 may communicate such an application request to the PCRN 136 via the Rx interface.

Service portal 160 may be a device that provides a subscriber with access to information regarding the subscriber's account. For example, service portal 160 may be a server provided by a network operator. UE 110 may connect to service portal 160 via packet data network 140 to view or change account information. Service portal 160 may be configured for communication with PCRN 136 or SPR 138 via an API that provides access to various functionality of PCRN 136. For example, service portal 160 may use the API to obtain session information regarding a connected subscriber. As another example, service portal 160 may be allowed to update SPR 138 with changes to subscriber information based interaction with a UE 110.

Figure 2:
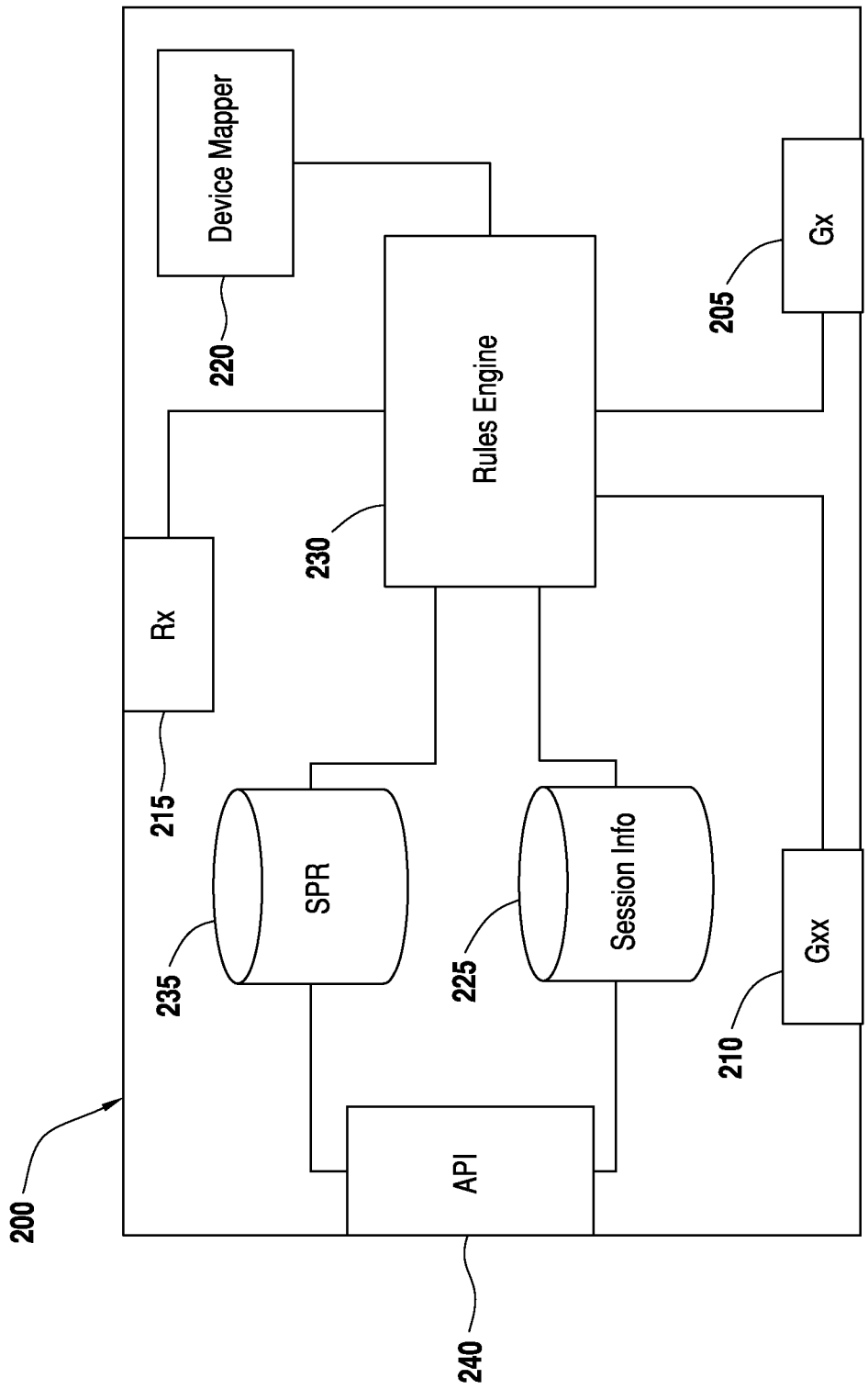
FIG. 2 illustrates a schematic diagram of an exemplary policy and charging rules node (PCRN)

FIG. 2 illustrates a schematic diagram of an exemplary PCRN 200. PCRN 200 may correspond to PCRN 136 shown in FIG. 1. PCRN 200 may be configured to make policy decisions based on the model of UE 110 attempting to attach to the network 100. PCRN 200 may include a Gx interface 205, a Gxx interface 210, an Rx interface 215, a device mapper 220, a session information storage 225, rules engine 230, SPR 235 and API 240.

Gx interface 205 may be an interface comprising hardware and/or executable instructions encoded on a machine-readable storage medium configured to communicate with a PGW such as PGW 134. Such communication may be implemented according to the 3GPP TS 29.212. Thus, Gx interface 205 may receive requests for PCC rules and transmit PCC rules for installation. Gx interface 210 may further receive UE-originated application requests, session requests, and event notifications in the form of a credit control request (CCR).

Gxx interface 210 may be an interface comprising hardware and/or executable instructions encoded on a machine-readable storage medium configured to communicate with a SGW such as SGW 132. Such communication may be implemented according to the 3GPP TS 29.212. Thus, Gxx interface 210 may receive requests for QoS rules and transmit QoS rules for installation. Gxx interface 210 may further receive UE-originated application requests, session requests, and event notifications in the form of a credit control request (CCR).

Rx interface 215 may be an interface comprising hardware and/or executable instructions encoded on a machine-readable storage medium configured to communicate with an AF such as AF 150. Such communication may be implemented according to the 3GPP TS 29.214. For example, Rx interface 205 may receive a service request (AAR) from AF 150.

Device mapper 220 may include hardware or executable instructions encoded on a machine-readable storage medium configured to determine a model of user equipment. Device mapper 220 may extract information from a received message such as a CCR. In particular, device mapper 220 may extract a User-Equipment-Info AVP, which may include an User-Equipment-Info-Type AVP and an User-Equipment-Info-Value AVP. Device mapper 220 may ensure that the User-Equipment-Info-Type AVP is a known type such as an international mobile station equipment identity (IMEI) or mobile equipment identifier (MEID). Device mapper 220 may interpret the User-Equipment-Info-Value AVP according to the User-Equipment-Info-Type AVP. For example, for an IMEI, device mapper 220 may extract the first eight digits of the IMEI as a Type Allocation Code (TAC). Device mapper 220 may then compare the TAC to a list of known devices. Each known device may be associated with a marketing name for the device. PCRN 200 may include rules based on either the marketing name or the TAC.

Session information storage 225 may be a non-transitory machine-readable storage medium configured to store session information for sessions managed by PCRN 200. Session information storage 225 may store any information received in a request in association with session identifiers and PCC rules generated by PCRN 200. In particular, information for an IP-CAN session authorized by PCRN 200 may include a session identifier, either the User-Equipment-Info AVP, TAC, or marketing name of the device, and an IP-address assigned to the UE 110 for the session.

Rules engine 230 may include hardware or executable instructions encoded on a machine-readable storage medium configured to make decisions based on available information and rules. Rules engine 230 may include various rule sets that may be evaluated based on a particular event or context. For example, rules engine 230 may evaluate an attachment rule set whenever PCRN 200 receives a message indicating a new device is attaching to the network 100. An attachment rule set will be further described with respect to FIG. 3.

SPR 235 may be a subscriber profile repository device similar to SPR 138. SPR 235 may be integrated with PCRN 200. SPR 235 may be accessed by rule engine 230 to provide subscriber information for use in evaluating rules. SPR 235 may also be accessed via API 240 to provide subscriber information to another network element or receive updated subscriber information.

API 240 may include hardware or executable instructions encoded on a machine-readable storage medium configured to communicate with an external device such as a service portal 160. API 240 may provide authorization features to ensure that the external device is allowed to communicate with PCRN 200. API 240 may make various features of PCRN 200 available to an external device. For example, API 240 may provide access to information stored in session information storage 225 or SPR 235. API 240 may also allow service portal 160 to update SPR 235 with updated subscriber information.

Figure 3:
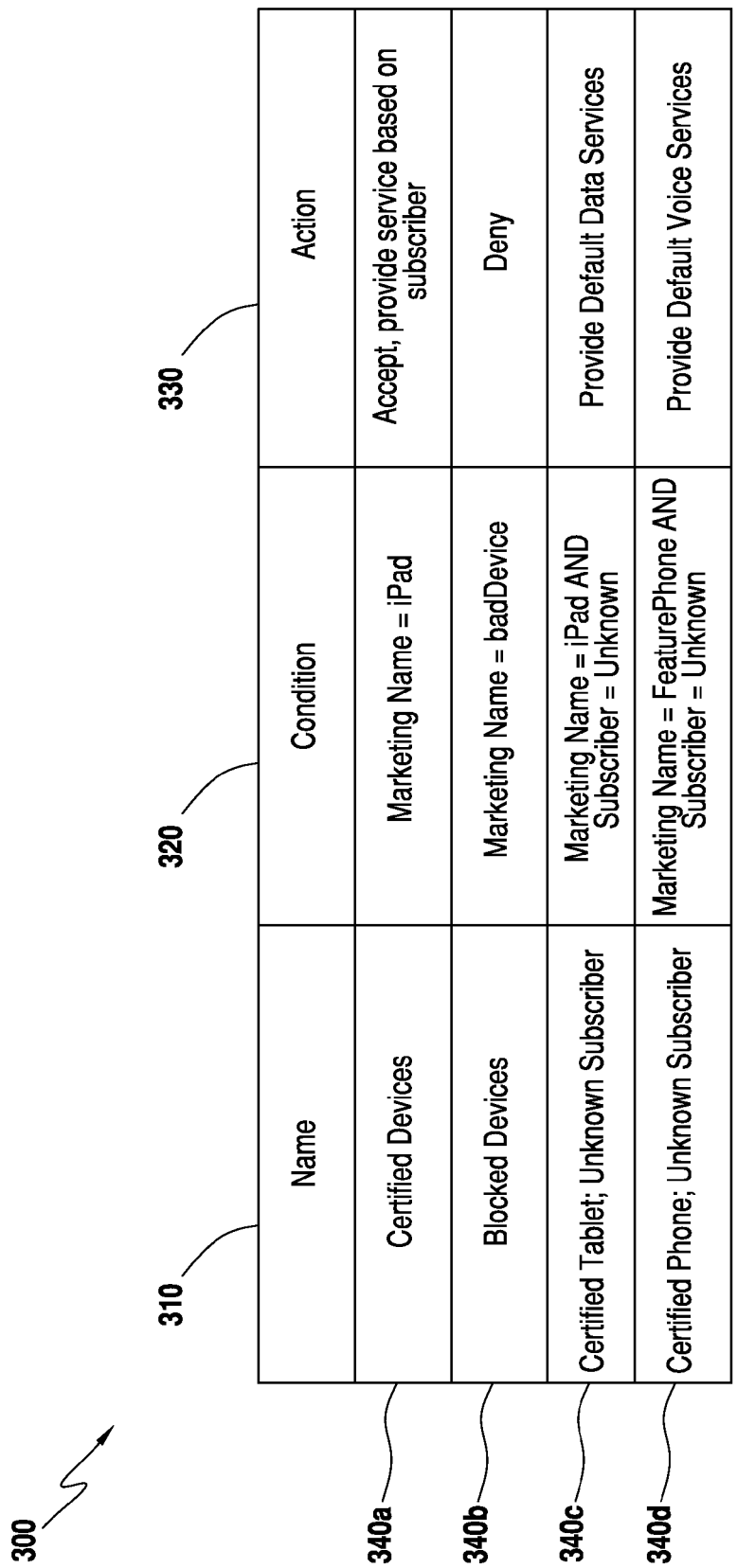
FIG. 3 illustrates an exemplary rule table.

FIG. 3 illustrates an exemplary rule table 300. Rule table 300 may provide rules to be evaluated by rules engine 230 in a particular situation. For example, rule table 300 may be an attachment rule table that may be evaluated whenever a new device attaches to the network 100. Evaluation of rule table 300 may be triggered by receipt of an initial CCR message from PGW 134. Rule table 300 may include a name field 310, a condition field 320, and an action field 330. Rule table 300 may be configured by an operator of PCRN 200.

Name field 310 may indicate a name of the rule. The name of the rule may be selected by the network operator to identify the rule. Name field 310 may also include a unique identifier.

Condition field 320 may include one or more logical statements that may be evaluated by rules engine 230. Condition field 320 may reference information received in a message or stored at PCRN 200. For example, in various embodiments, the marketing name received in a CCR message may be indicated as PCRN.IMEI.TAC(Gx-Message.User-Equipment-Info-Value.IMEISV.TAC).MarketingName.

Action field 330 may indicate one or more actions for PCRN 200 to execute if the condition is true. For example, action field 330 may indicate how PCRN 200 should respond to a request. Accordingly, rules table 300 may be used to make policy decisions to select actions in response to requests.

Rules 340 may be rules configured by a network operator. For example rule 340a may be named "Certified Devices" and determine whether a device attempting to attach to the network 100 is on a list of certified devices. For example, rule 340a may allow access if the device has the marketing name "iPad". Rule 340a may include a plurality of marketing names or TACs. A marketing name may be generic to several versions of a device and PCRN 200 may use partial matching. As another example, rule 340b may be named "Blocked Devices" and determine whether a device attempting to attach to the network 100 is on a list of banned devices. If the device is on the banned list, PCRN 200 may deny the request to attach to the network. As another example, rule 340c may be named "Certified Tablet; Unknown Subscriber." Rule 340c may determine that the device is a certified tablet device and the subscriber is unknown and provide default services to the device. Default services may be, for example, a trial period for the device user to try the mobile network. For example, default services for a tablet device may include data service. As another example, rule 340d may be named "Certified Phone; Unknown Subscriber." Rule 340d may determine that the device is a certified phone and the subscriber is unknown and provide default voice service to the device.

Figure 4:
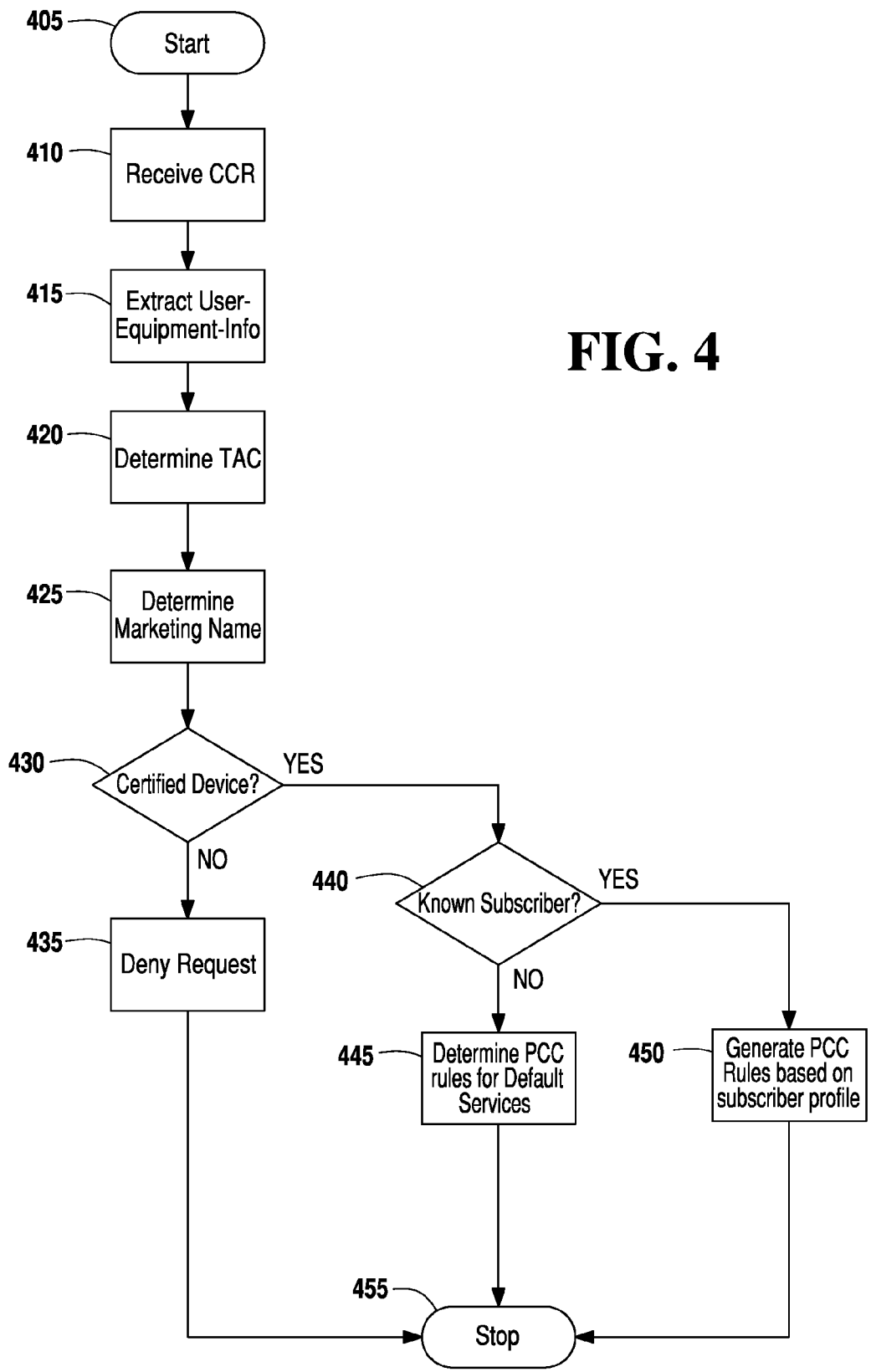
FIG. 4 illustrates a flowchart showing an exemplary method for making policy decisions based on user equipment type.

FIG. 4 illustrates a flowchart showing an exemplary method 400 for making policy decisions based on user equipment type. The method 400 may be performed by a policy service such as PCRN 136 or PCRN 200. The method 400 may begin at step 405 and proceed to step 410.

In step 410, the PCRN 200 may receive a CCR message requesting services for a user equipment 110. The CCR message may include information regarding the UE 110 including a User-Equipment-Info AVP, a subscriber identifier, and an IP address of the UE 110.

In step 415, PCRN 200 may extract the User-Equipment-Info AVP from the CCR message. In step 420, PCRN 200 may determine the TAC based on the User-Equipment-Info AVP. PCRN 200 may extract the eight digits of the TAC from the User-Equipment-Info-Value AVP based on the User-Equipment-Info-Type AVP.

In step 425, PCRN 200 may determine a marketing name for the UE 110 based on the TAC. The marketing name may be a commercial name of the model of the device. The marketing name may apply to one or more models of a device. For example, the marketing name "iPad" may refer to an Apple iPad, iPad 2, or iPad mini. PCRN 200 may also use partial matching with marketing names. For example an iPad2 or an iPad mini may both match a rule using the name "iPad". PCRN 200 may store any information associated with the UE 110, the CCR message, or the subscriber in session information storage 225. For example, PCRN 200 may store the user identification, the IP address, the User-Equipment-Info-AVP or extracted elements, the marketing name, or any combination of this information.

In step 430, PCRN 200 may determine whether the UE 110 is a certified device. In various embodiments, PCRN 200 may use a rules engine 230 to evaluate attachment rules set 300 to determine whether UE 110 is a certified device. In various embodiments, a PCRN 200 may determine whether the TAC or marketing name corresponds to a certified device using to a list, filter, software module, or ASIC. Alternatively, PCRN 200 may determine whether the TAC or marketing name is on a list of banned devices. PCRN 200 may operate on the assumption that any device that is not banned is certified. If the UE 110 is not a certified device, the method 400 may proceed to step 435. If the UE 110 is a certified device, the method 400 may proceed to step 440.

In step 435, PCRN 200 may determine that the banned or not certified device 435 should not be provided with service. Accordingly, PCRN 200 may send a message such as a CCA message denying the received request. The method 400 may then proceed to step 455, where the method ends.

In step 440, PCRN 200 may determine whether the subscriber associated with UE 110 is a known subscriber. PCRN 200 may query SPR 138 or SPR 235 with a subscriber identifier included in the CCR message to obtain a subscriber profile. If the subscriber identifier is not known to the SPR, PCRN may receive an indication that the subscriber identifier is unknown. If the subscriber is unknown, the method 400 may proceed to step 445. If the subscriber is known, the method 400 may proceed to step 450.

In step 445, the PCRN 200 may determine PCC rules for default services for the UE 110. A service provider may provide default services to a certified device of an unknown subscriber in order to allow the user to experience the network. For example, default services may be used to demonstrate data transfer rates or call quality. PCRN 200 may consider the characteristics of the UE 110 when determining PCC rules for default services. For example, PCRN 200 may provide data service for a tablet device with QoS settings that match the capabilities of the device. As another example, PCRN 200 may provide voice and data service for a smart phone. PCRN 200 may include the PCC rules in a CCA message in response to the CCR message. Accordingly, PCRN 200 may send the PCC rules to PGW 134 in order to provide the services. The method 400 may then proceed to step 455, where the method ends.

In step 450, PCRN 200 may generate PCC rules based on the subscriber profile of the known subscriber. PCRN 200 may generate the PCC rules based on a service plan selected by the subscriber. PCRN 200 may allow the services selected by the subscriber. For example, PCRN 200 may generate the PCC rules by evaluating a different rule table with conditions based on elements of the subscriber profile. The method 400 may then proceed to step 455, where the method ends.

Figure 5:
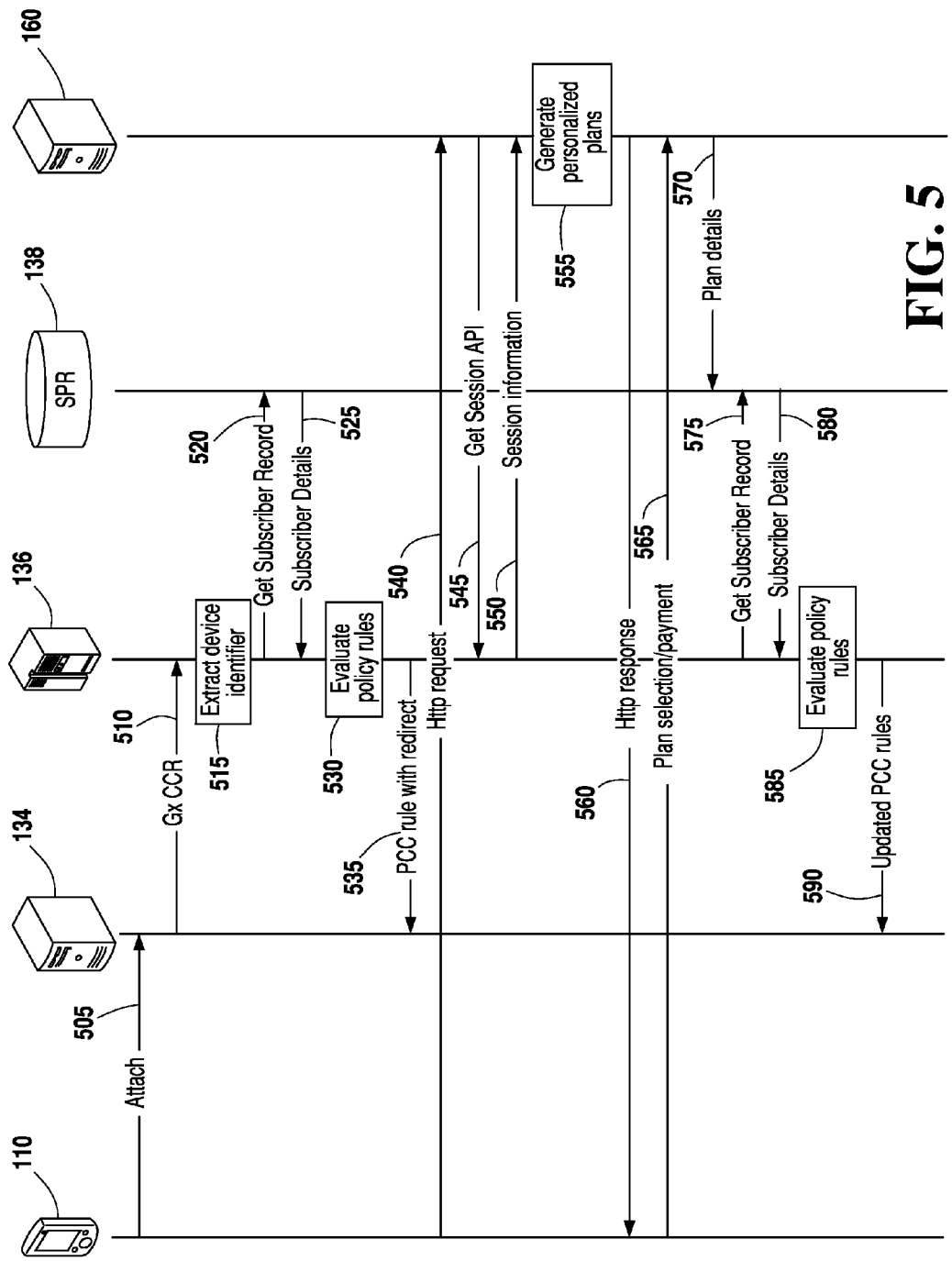
FIG. 5 illustrates a message diagram showing an exemplary method of providing customized service plans.

FIG. 5 illustrates a message diagram showing an exemplary method 500 of providing customized service plans. The method 500 may be performed by the various components of network 100 including UE 110, PGW 134, PCRN 136, SPR 138, and service portal 160. As discussed above, SPR 138 may be integrated with PCRN 136 as in PCRN 200.

In step 505, the UE device 110 may initiate attachment to the network 100. The UE 110 may transmit a signal requesting attachment through base station 120 and SGW 132. PGW 134 may receive the request and determine that the UE 110 is requesting a new session. In step 510, PGW 134 may generate a CCR message to send to PCRN 136. The CCR message may include information regarding the UE 110 including a User-Equipment-Info AVP and a subscriber identifier.

In step 515, PCRN 136 may extract and analyze the User-Equipment-Info AVP. PCRN 136 may extract the TAC from the User-Equipment-Info-Value AVP and use the device mapper 220 to determine a marketing name for the UE 110.

In step 520, PCRN 136 may request subscriber information from SPR 138 based on the subscriber identifier included in the CCR message. In step 525, SPR 138 may return available subscriber information. If SPR 138 does not recognize the subscriber identifier, SPR 138 may indicate that the subscriber is unknown. For example, the subscriber identifier may be associated with a new SIM card that has not been registered to an individual. PCRN 200 may store any information associated with the UE 110, the CCR message, or the subscriber in session information storage 225. For example, PCRN 200 may store the user identification, the IP address, the User-Equipment-Info-AVP or extracted elements, the marketing name, or any combination of this information.

In step 530, PCRN 136 may evaluate policy rules to determine an action for the CCR message. PCRN 136 may evaluate an attachment rule set that includes rules for evaluating an initial CCR message. PCRN 136 may evaluate the condition portion of each rule using the information in the CCR message, the marketing name of the UE 110, and subscriber information from SPR 138. As discussed above regarding FIG. 3, PCRN 136 may determine whether to allow or deny the request based upon whether the UE 110 is a certified device. PCRN 136 may also determine whether to provide an unrecognized subscriber with default services based upon whether the UE 110 is a certified device. In various embodiments, PCRN 136 may also determine that the UE 110 is eligible only for redirect service. For example, if the subscriber unknown or is known but the account is expired or out of credit, PCRN 136 may determine that the UE 110 should be provided with redirect services.

In step 535, PCRN 136 may respond to the CCR message with a CCA message. If PCRN 136 determines that the attachment request should be denied, PCRN 136 may send a CCA message with no PCC rules. If PCRN 136 determines that the request should be granted, PCRN 136 may generate PCC rules and establish an IP-CAN session. If PCRN 136 determines that the attachment request from a known subscriber should be allowed, PCRN 136 may generate PCC rules based on subscriber information to include in the CCA message. If PCRN 136 determines that default services should be provided, PCRN 136 may include default PCC rules corresponding to the selected default services. If PCRN 136 determines that redirect services should be provided, PCRN 136 may provide PCC rules that only allow the UE 110 to access the service portal 160. PCRN 136 may send the PCC rules to PGW 134 for enforcement.

In step 540, UE 110 may attempt to communicate using network 100. Based on the redirect PCC rules, PGW 134 may redirect UE 110 to service portal 160. For example, PGW 134 may send an HTTP redirect to UE 110 with the address of the service portal 160. Service portal 160 may then receive a request from UE 110. The request may be an HTTP request for a webpage.

In step 545, service portal 160 may request information from PCRN 136 using the API 240. In particular, service portal 160 may request session information from PCRN 136 for the UE 110. Service portal 160 may identify the UE 110 using the IP address of the UE 110. The IP address may be associated with the IP-CAN session established by the PCC rules in step 535. In step 550, PCRN 136 may determine the requested session information based on session information storage 225. PCRN 136 may send the information to service portal 160 using the API 240. The information may include the user-equipment-info AVP or the marketing name of the UE 110.

In step 555, service portal 160 may generate customized plans for the subscriber based on information regarding UE 110. Service portal 160 may offer service plans corresponding to the functionality of UE 110. For example, service portal 160 may offer a data only plan if UE 110 is a tablet device.

In step 560, service portal 160 may send UE 110 information regarding the customized plans. For example, UE 110 may send a webpage that displays properties and prices for the customized plans. In step 565, UE 110 may send the user's selection of a plan and payment information to service portal 160. In various embodiments, UE 110 may send subscriber information in order to create a new account for the subscriber. Service portal 160 may verify the received information and charge for the selected plan.

In step 570, service portal 160 may send updated subscription information to SPR 138. In various embodiments where SPR 138 is integrated with PCRN 136, service portal 160 may use API 240 to send the updated subscription information. In other embodiments, SPR 138 may include its own API or use a communications protocol for receiving updated subscription information.

In step 575, PCRN 136 may request the subscriber record from SPR 138. In step 580, SPR 138 may provide the updated subscription information including the details regarding the selected plan.

In step 585, PCRN 136 may reevaluate the policy rules based on the original CCR or an update CCR and the updated subscription information. PCRN 136 may generate new PCC rules to provide the services included in the selected plan. In step 590, PCRN 136 may send the new PCC rules to PGW 134 for enforcement. UE 110 may then be able to access the services according to the selected plan. The method 500 may then end.

According to the foregoing, various exemplary embodiments provide for policy decisions based on user equipment device. In particular, by analyzing the TAC, a policy server may determine the marketing name of a device and provide policy according to the model of the device.

It should be apparent from the foregoing description that various exemplary embodiments of the invention may be implemented in hardware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method performed by a policy server, the method comprising:
    receiving a request for service, the request including an identification of user equipment;
    determining a user equipment type;
    evaluating a policy rule based on the user equipment type, the policy rule including a condition referencing at least one user equipment type;
        responding to the request for service based on evaluation of the policy rule;
        authorizing a default session configured to provide access to a service portal;
    storing the identification of user equipment in association with the default session;
        receiving, from the portal, a request for identification of user equipment associated with the session;
        sending the stored identification of user equipment to the portal;
        receiving new subscriber information including the identification of user equipment; and
    updating the session based on the new subscriber information.

2. The method of claim 1, further comprising determining a marketing name for the user equipment, wherein the condition references the at least one user equipment type according to the marketing name.

3. The method of claim 2, wherein the marketing name corresponds to a plurality of user equipment types.

4. The method of claim 1, wherein the user equipment type is a type allocation code (TAC) extracted from a user-equipment-info attribute value pair (AVP) received in the request for service.

5. The method of claim 1, wherein the condition references a plurality of user equipment types.

6. The method of claim 1, further comprising:
    determining that the request for service is not related to a known subscriber; and
    authorizing default services based on the user equipment type.

7. The method of claim 6, wherein the default services include a limit on at least one of an available time period and a data volume.

8. The method of claim 1, further comprising:
    determining that the request for service is not related to a known subscriber, wherein the default session is based on an unknown subscriber identifier and certified user equipment type.

9. The method of claim 1, further comprising: storing an IP address for the default session, wherein the request for identification of user equipment associated with the session includes the IP address.

10. A policy server comprising:
    an interface configured to receive a service request initiated by a user equipment attaching to a mobile network, the service request including a user equipment identification;
    a device mapper configured to determine a marketing name of the device based on the user equipment identification;
    a rules engine processor configured to evaluate conditions of policy rules and execute actions corresponding to when conditions are true, at least one policy rule including a condition based on the marketing name of the device;
    respond to the request for service based on evaluation of the policy rule;
    authorize a default session configured to provide access to a service portal;
    store the identification of user equipment in association with the default session;
    receive, from the portal, a request for identification of user equipment associated with the session;
    send the stored identification of user equipment to the portal;
    receive new subscriber information including the identification of user equipment; and
    update the session based on the new subscriber information.

11. The policy server of claim 10, wherein the device mapper comprises a non-transitory machine-readable storage medium storing a plurality of type allocation codes, each type allocation code mapped to a marketing name.

12. The policy server of claim 10, wherein the condition of the at least one rule includes a certified device marketing name and the action of the at least one rule instructs the rules engine to allow a session providing service to the user equipment.

13. The policy server of claim 12, further comprising:
a session information storage configured to store information regarding the session including the marketing name of the user equipment; and
an application programming interface configured to provide an external service portal access to the session information and configured to receive subscriber information from the service portal.

14. A non-transitory machine-readable storage medium encoded with instructions executable by a processor of a policy server, the non-transitory machine-readable storage medium comprising instructions for:
receiving a request for service, the request including an identification of user equipment; determining a user equipment type;
evaluating a policy rule based on the user equipment type, the policy rule including a condition referencing at least one user equipment type;
responding to the request for service based on evaluation of the policy rule;
authorizing a default session configured to provide access to a service portal;
storing the identification of user equipment in association with the default session;
receiving, from the portal, a request for identification of user equipment associated with the session;
sending the stored identification of user equipment to the portal;
receiving new subscriber information including the identification of user equipment; and
updating the session based on the new subscriber information.

15. The non-transitory machine-readable storage medium of claim 14, further comprising instructions for determining a marketing name for the user equipment, wherein the condition references the at least one user equipment type according to the marketing name.

16. The non-transitory machine-readable storage medium of claim 15, wherein the user equipment type is a type allocation code (TAC) extracted from a user-equipment-info attribute value pair (AVP) received in the request for service.

17. The non-transitory machine-readable storage medium of claim 14, further comprising instructions for:
determining that the request for service is not related to a known subscriber; and
authorizing default services based on the user equipment type.

18. The non-transitory machine-readable storage medium of claim 14, further comprising instructions for:
determining that the request for service is not related to a known subscriber, wherein the default session is based on an unknown subscriber identifier and certified user equipment type; and
storing an IP address of the default session, wherein the request for identification of user equipment associated with the session includes the IP address.

* * * * *